United States Patent Office 3,367,950
Patented Feb. 6, 1968

3,367,950
PROCESS FOR THE ISOLATION OF CHOLECAL-
CIFEROL FROM A MIXTURE OBTAINED ON
IRRADIATION OF 7-DEHYDROCHOLESTEROL
Henryk Stanislaw Salwa, Ul. Sniadeckich 1/15 m. 1;
Romana Teofila Jaworska, Ul. Ksiecia Janusza 16 m.
23; Wieslaw Ludwik Levenstein, Ul. Stoleczna 4 m. 22;
Zofia Bury, Ul. Smiala 1 m. 28; Jacek Vaedtke, Ul.
Lowicka 7/15 m. 50; Janina Kazimiera Jedrzejuk, Aleja
Zjednoczenia 3/9 m. 179; and Anna Klara Czarnocka,
Ul. Mazowiecka 11 m. 49, all of Warsaw, Poland
No Drawing. Filed Dec. 17, 1965, Ser. No. 514,649
Claims priority, application Poland, Dec. 19, 1964,
P 106,698
6 Claims. (Cl. 260—397.25)

The production of cholecalciferol i.e., vitamin $D_3$ consists in irradiation of 7-dehydrocholesterol with ultraviolet rays mostly in an organic solvent. The mixture obtained on irradiation contains an unreacted portion of the substrate and an isomeric compound passing under the influence of heating into cholecalciferol called previtamin $D_3$ or precholecalciferol, and contaminants including other isomers and side products of the photolysis reaction. The greater portion of the unreacted 7-dehydrocholesterol is separated from the mixture making use of its poor solubility in alcohols. Thereupon the precholecalciferol is converted into cholecalciferol by heating the solution. In this way a mixture containing up to 50% of cholecalciferol is formed, but the separation of pure cholecalciferol from this mixture is rather difficult and complicated.

Known processes for the separation of cholecalciferol from the said mixture consist in producing cholecalciferol complexes with cholesterol, cholestanol or coprostanol. By introducing into the solution the second component the produced complex is precipitated. A further problem is the decomposition of the obtained complex. There are known processes based on the action of certain substances which drive the cholecalciferol from the complex by producing a new complex with the said certain substance. The considerably more convenient process according to Polish Patent No. 48,332 consists in decomposing the cholecalciferol-cholesterol-complex on an absorbent, particularly aluminium oxide, from which after adsorption of the complex the individual components of this complex are selectively eluted.

The present invention consists in making use, for the separation of cholecalciferol, of its capacity for forming the cholecalciferol-7-dehydrocholesterol-complex. This complex crystallizes from a mixture containing both the components, especially in equivalent amounts. In the known decomposition methods this complex does not separate, mainly as a result of the fact that the greater 7-dehydrocholesterol portion is already separated before precholecalciferol is converted to cholecalciferol. On the other hand, if a sufficient quantity of 7-dehydrocholesterol is left in the mixture and precholecaciferol is converted by heating into cholecalciferol or if after the separation of 7-dehydrocholesterol in a known manner and after the precholecalciferol is converted to cholecalciferol the 7-dehydrocholesterol content of the mixture is completed to a quantity equivalent to that of the cholecalciferol contained therein, then the complex separates in good yield. For the decomposition of the cholecalciferol-7-dehydrocholesterol complex, the use of the adsorption method analogous to that of the cholecalciferol-cholesterol complex decomposition according to the above mentioned patent is particularly useful.

The process according to the invention for the separation of cholecalciferol from the reaction mixture is advantageous when compared with the known methods with particular respect to the fact that no foreign substances are introduced into the mixture and therefore the composition of the mixture is not complicated. In consequence, a considerable simplification of the proceeding is obtained and the 7-dehydrocholesterol used for the production of the complex becomes reobtainable.

According to the invention, the unreacted 7-dehydrocholesterol is partially separated from the mixture obtained after its irradiation, the solvent in which the irradiation has been effected is removed under reduced pressure, the residue is combined with methanol and the precipitated 7-dehydrocholesterol is filtered. The alcoholic filtrate is then heated for the purpose of converting precholecalciferol to cholecalciferol. After termination of the thermoisomerization the amount of cholecalciferol and of 7-dehydrocholesterol in the filtrate is determined and the quantity of the latter component in the solution is replenished, if necessary, so as to obtain a proportion between cholecalciferol and 7-dehydrocholesterol on the order of 1:1. A 7-dehydrocholesterol excess should be avoided because it negatively influences the precipitation of the cholesterol-7-dehydrocholesterol complex compound. Subsequently the solution is concentrated under decreased pressure to a small volume whereby the precipitation of the complex compound is caused which after cooling the mixture, is separated by filtration. The obtained product after drying contains 42–45% cholecalciferol. This is about 85% of the cholecalciferol initially contained in the solution. In addition, it contains an equivalent amount of 7-dehydrocholesterol and 10–15% of contaminations.

The complex compound is subjected to decomposition on active adsorbents of which aluminium oxide is especially suitable. By suitably conducting the operation, the purification and separation of the individual components of the complex are simultaneously effected. A benzol solution of the complex compound is passed through a column with aluminium oxide and is then eluted at first with pure benzene and subsequently with a mixture of benzene and 95% ethanol. In collecting the individual fractions of the eluate, there are successively obtained: a solution of the pure cholecalciferol, a solution of cholecalciferol with an admixture of 7-dehydrocholesterol, and a solution of the pure cholecalciferol, a solution of cholecalcontaminants remains on the column.

*Example*

A benzene solution of 14.4 g. of 7-dehydrocholesterol was irradiated with ultra-violet rays and then evaporated under decreased pressure until a thick mass is obtained. About 100 ml. of methanol was added thereto, the mixture was then shaken for a few minutes, and subsequently the undissolved 7-dehydrocholesterol was filtered off by washing it on a filter with 50 ml. of methanol. After drying, the sediment of the returned 7-dehydrocholesterol weighed 10.4 g. The filtrate, saturated with nitrogen in a tightly closed container, was placed in a thermostat at a temperature of 36° for 3 days. After this period it was ascertained that the solution contained about 1.6 g. of cholecalciferol and 0.45 g. of 7-dehydrocholesterol. 1.15 g of 7-dehydrocholesterol was added to the solution and the mixture was heated until complete dissolution of the added substance occurred. The solution was then concentrated under decreased pressure to a volume of about 30 ml., a thick suspension of the separated complex compound being obtained. The mixture was held in an icebox til the next day. After filtering and drying, 3 g. of a crystalline substance containing 45% of cholecalciferol, was obtained. The determination was spectrophotometrically made. The obtained substance was dissolved in 70 ml. of benzene and then passed through a column of 20 mm. diameter containing 80 g. of aluminium oxide of 3rd activity degree according to Brockmann. After the solution was passed through the column it was eluted with pure benzene. A first fraction contained 150 ml. of pure benzene eluate, a second fraction of a volume of 210 ml. contained 1.25 g. of cholecalciferol, a third fraction of a volume of 180 ml. contained 60 mg. of cholecalciferol and 30 mg. of 7-dehydrocholesterol. Subsequently, the column was eluted with benzene with an addition of 10% of ethanol, and a fourth fraction containing 1.4 g. of 7-dehydrocholesterol was obtained. The second fraction was evaporated under decreased pressure til dry and the residue was crystallized from acetone with an addition of water. 1.05 g. of crystalline cholecalciferol having a melting point of 83–85° was obtained. The third fraction was combined with the mother liquors from the second fraction, the solvent was removed under decreased pressure, the dry residue was dissolved in methanol and after adding 0.2 g. of 7-dehydrocholesterol, 0.4 g. of a cholecalciferol-7-dehydrocholesterol complex compound was obtained. From the fourth fraction, on removal of benzene and shaking out the residue with methanol, 1.3 g. of 7-dehydrocholestrol were obtained.

We claim:

1. A process for obtaining cholecalciferol which comprises irradiating a solution of 7-dehydrocholesterol with ultra violet light to convert a portion of the 7-dehydrocholesterol in the solution to precholecalciferol, removing unconverted 7-dehydrocholesterol from the irradiated solution, heating the precholecalciferol to form a solution mixture of cholecalciferol and 7-dehydrocholesterol, adding to the solution mixture 7-dehydrocholesterol in an amount sufficient to provide equal weights of cholecalciferol and 7-dehydrocholesterol, heating the solution mixture to dissolve the added 7-dehydrocholesterol, reducing the volume of the solution mixture to form a complex compound of cholecalciferol and 7-dehydrocholesterol, subjecting the complex compound to decomposition by adsorbing same on an activated adsorbent to form cholecalciferol, 7-dehydrocholesterol and a mixture thereof, eluting the decomposed complex compound from the activated adsorbent to obtain separate portions of cholecalciferol, 7-dehydrocholesterol and a mixture thereof.

2. A process as claimed in claim 1, wherein a benzene solution of 7-dehydrocholesterol is irradiated.

3. A process as claimed in claim 1, wherein the activated adsorbent is aluminium oxide.

4. A process as claimed in claim 3, wherein the aluminium oxide has an activity of the 3rd degree.

5. A process as claimed in claim 1, wherein eluting is effected with benzene and a benzene-ethanol mixture.

6. A process as claimed in claim 1, wherein the precholecalciferol is heated at about 36° C. for several days.

References Cited
UNITED STATES PATENTS 3,176,029   3/1965   Bharucha et al. _____ 260—397

ELBERT L. ROBERTS, *Primary Examiner.*